DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 866

T921,014
METHOD FOR REMOVING FISSION PRODUCTS FROM A NUCLEAR REACTOR COOLANT

Richard P. Colburn, Youngwood, Pa., assignor to Westinghouse Electric Corporation, Pittsburgh, Pa.

Filed June 9, 1972, Ser. No. 261,476
Int. Cl. G21c *19/20, 19/32*
U.S. Cl. 176—37
1 Sheet Drawing. 13 Pages Specification

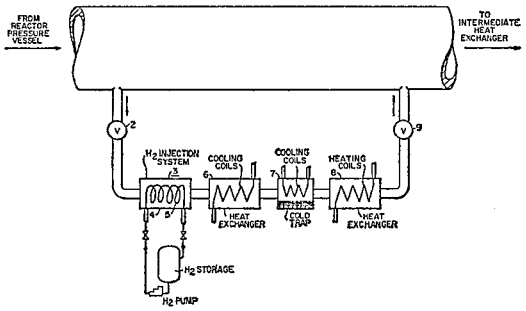

A method for removing cesium 137, iodine 131 and tritium from a liquid sodium reactor coolant. Hydrogen is introduced into the liquid sodium causing sodium hydride to precipitate in a cold trap. The cesium iodine and tritium isotopes are removed from the liquid sodium by co-precipitating as impurities in the sodium hydride.

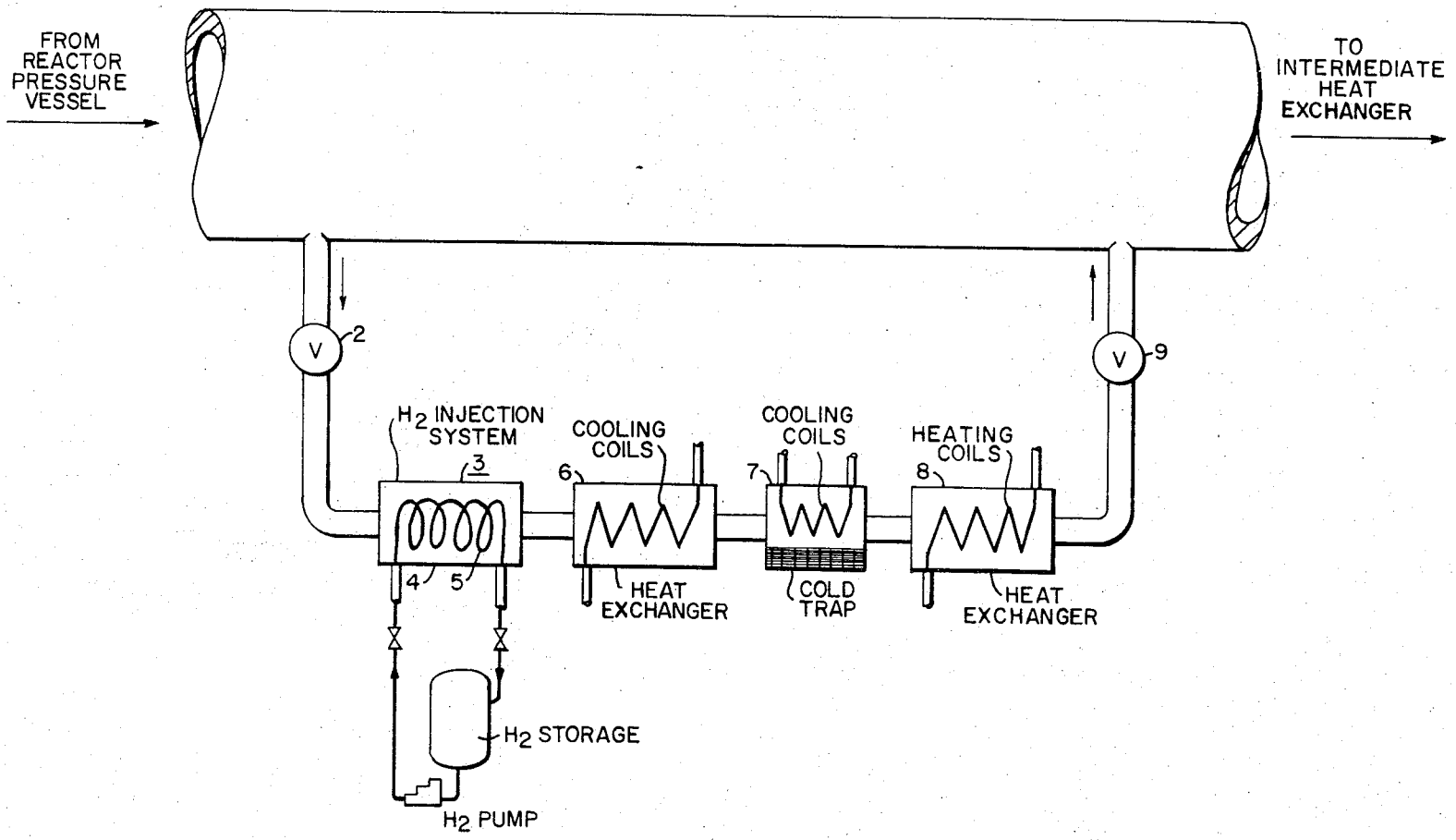

METHOD FOR REMOVING FISSION PRODUCTS FROM
A NUCLEAR REACTOR COOLANT
Filed June 9, 1972